(12) United States Patent
Mohseni et al.

(10) Patent No.: US 6,535,562 B1
(45) Date of Patent: Mar. 18, 2003

(54) METHOD AND APPARATUS FOR ROTATING THE PHASE OF A COMPLEX SIGNAL

(75) Inventors: Mohammad Jafar Mohseni, San Diego, CA (US); Brian Butler, La Jolla, CA (US); Deepu John, San Diego, CA (US); Haitao Zhang, San Diego, CA (US)

(73) Assignee: Qualcomm Inc., San Diego, CA (US)

( * ) Notice: Subject to any disclaimer, the term of this patent is extended or adjusted under 35 U.S.C. 154(b) by 0 days.

(21) Appl. No.: 09/452,045

(22) Filed: Nov. 30, 1999

(51) Int. Cl.[7] ............................................. H04L 27/36
(52) U.S. Cl. ..................... 375/296; 375/298; 341/118; 370/206
(58) Field of Search ................................. 375/141, 146, 375/147, 261, 281, 298, 302, 296; 370/203, 206; 341/118

(56) References Cited

U.S. PATENT DOCUMENTS

| 5,140,613 A | 8/1992 | Birgenheier et al. | ........... 375/67 |
| 5,533,012 A | * 7/1996 | Fukasawa et al. | ............ 370/18 |
| 5,892,774 A | 4/1999 | Zehavi et al. | ............... 370/527 |
| 5,903,555 A | 5/1999 | Wildauer et al. | ........... 370/342 |
| 6,181,674 B1 | * 1/2001 | Xin et al. | ................... 370/230 |

FOREIGN PATENT DOCUMENTS

| EP | 0 924 870 A2 | 6/1999 |
| JP | 08195712 | 7/1996 |
| JP | 10336151 | 12/1998 |

* cited by examiner

*Primary Examiner*—Amanda T. Le
(74) *Attorney, Agent, or Firm*—Philip R. Wadsworth; Charles D. Brown; George C. Pappas

(57) ABSTRACT

In applications employing phase-shift keying modulation, a phase rotator as disclosed herein is used to rotate the constellation of signal vectors before carrier modulation in order to maximize modulator output power. Such a rotator may be applied in the digital domain (to complex signals having either binary-valued or multi-valued components) or in the analog domain.

32 Claims, 18 Drawing Sheets

METHOD AND APPARATUS FOR ROTATING THE PHASE OF A COMPLEX SIGNAL

BACKGROUND OF THE INVENTION

1. Field of the Invention

This invention relates to signal processing. More specifically, this invention relates to signal processing as applied to wireless communications.

2. Description of Related Art and General Background

Spread spectrum communication techniques offer robustness to noise, low transmission power, and a low probability of intercept. For such reasons, much of the early development of spread spectrum technology was performed by military researchers. Recently, however, the advantages of this technology have led to its increasing use for consumer applications as well: most notably, in advanced digital cellular telephone systems.

Communication systems that support multiple individual signals over a single channel must employ some technique to make the various signals distinguishable at the receiver. In time-division multiple-access (TDMA) systems, the individual signals are time-compressed and transmitted in non-overlapping intervals such that they are orthogonal (and thus separable) in time space. In frequency-division multiple-access (FDMA) systems, the signals are bandlimited and transmitted in nonoverlapping subchannels such that they are orthogonal in frequency space. In code-division multiple-access (CDMA) systems, the signals are spread through modulation by orthogonal code sequences such that they are orthogonal in code space and may be transmitted across the same channel at the same time while remaining distinguishable from each other at the receiver.

Whereas most other communication techniques modulate a carrier signal with one or more data signals alone, spread spectrum techniques also modulate the carrier with a pseudorandom noise or 'pseudonoise' (PN) signal. These PN signals are selected to have minimal cross-correlation, and their properties and generation are discussed in more detail in, e.g., Modern Communication Systems: Principles and Applications, Leon W. Couch III, Prentice Hall, 1995, pp. 381–83, and chapter 2 of CDMA: Principles of Spread Spectrum Communication, Andrew J. Viterbi, Addison-Wesley, 1995. In the frequency-hopping variant of spread spectrum systems, the value of the PN signal at a particular instant determines the frequency of the transmitted signal, and thus the spectrum of the signal is spread. In the direct sequence spread spectrum (DSSS) variant, the bit rate of the PN signal (called the 'chip rate') is chosen to be higher than the bit rate of the information signal, such that when the carrier is modulated by both signals, its spectrum is spread.

In a CDMA DSSS system, then, each individual signal is modulated by a data signal and a pseudonoise (PN) signal of predetermined period that is at least nearly orthogonal to the PN signals assigned to all other users, thus spreading the spectrum of the signal while rendering it distinguishable from the other users' signals. Before spreading and modulation onto the carrier, the data signal typically undergoes various encoding and interleaving operations designed, for example, to increase data redundancy and allow error correction at the receiver. The data signals may also be encrypted to provide extra security against eavesdroppers. The generation of CDMA signals in a spread spectrum communications system is disclosed in U.S. Pat. No. 5,103, 459, issued Apr. 7, 1992, entitled "SYSTEM AND METHOD FOR GENERATING SIGNAL WAVEFORMS IN A CDMA CELLULAR TELEPHONE SYSTEM," and assigned to the assignee of the present invention.

Various schemes exist for modulating baseband data signals onto RF carriers. These schemes typically operate by varying the amplitude phase, and/or frequency of one or both of the in-phase (I) and quadrature (Q) components of the carrier according to the data symbol to be transmitted at any particular instant. For example, CDMA DSSS systems commonly use a variant of phase-shift keying (PSK), in which the phase states in the carrier components correspond to data symbols being transferred. Phase-shift keying modulation may also be used in many non-CDMA and non-DSSS applications as well.

In one example of a system using binary PSK (BPSK) modulation, a transition of the carrier from a base phase state (defining a phase of zero) to a second phase state which is different by 180 degrees (i.e. a phase shift of $\pi$ radians away from zero) may be designated to indicate a transition from a data symbol 0 to a data symbol 1. The converse phase shift of $\pi$ radians back to zero would then be designated to indicate a transition from a data symbol 1 to a data symbol 0. Between these transitions, the phase of the carrier indicates whether a data symbol 0 is being transmitted (phase of zero) or a data symbol 1 instead (phase of $\pi$ radians).

An improved ratio of data rate to bandwidth may be obtained by using quadrature PSK (QPSK) modulation, in which the data symbols are encoded into 180-degree shifts in both the I and Q components. This scheme results in a maximum carrier phase shift of 180 degrees at every symbol transition. A variant of QPSK called offset QPSK (OQPSK) staggers the symbol transitions across the I and Q components in time, thereby reducing the maximum instantaneous phase shift in the carrier to 90 degrees. The above-mentioned and other variants of PSK modulation are well known in the art.

SUMMARY OF THE INVENTION

An apparatus is described which receives a complex signal having a phase and outputs another complex signal having a phase. Each of these complex signals has a first and a second component. The first component of the output signal is a difference of the components of the input signal, the second component of the output signal is a sum of the components of the input signal, and a phase angle of the output signal is rotated as compared to a phase angle of the input signal.

DETAILED DESCRIPTION OF THE INVENTION

Figure 1:
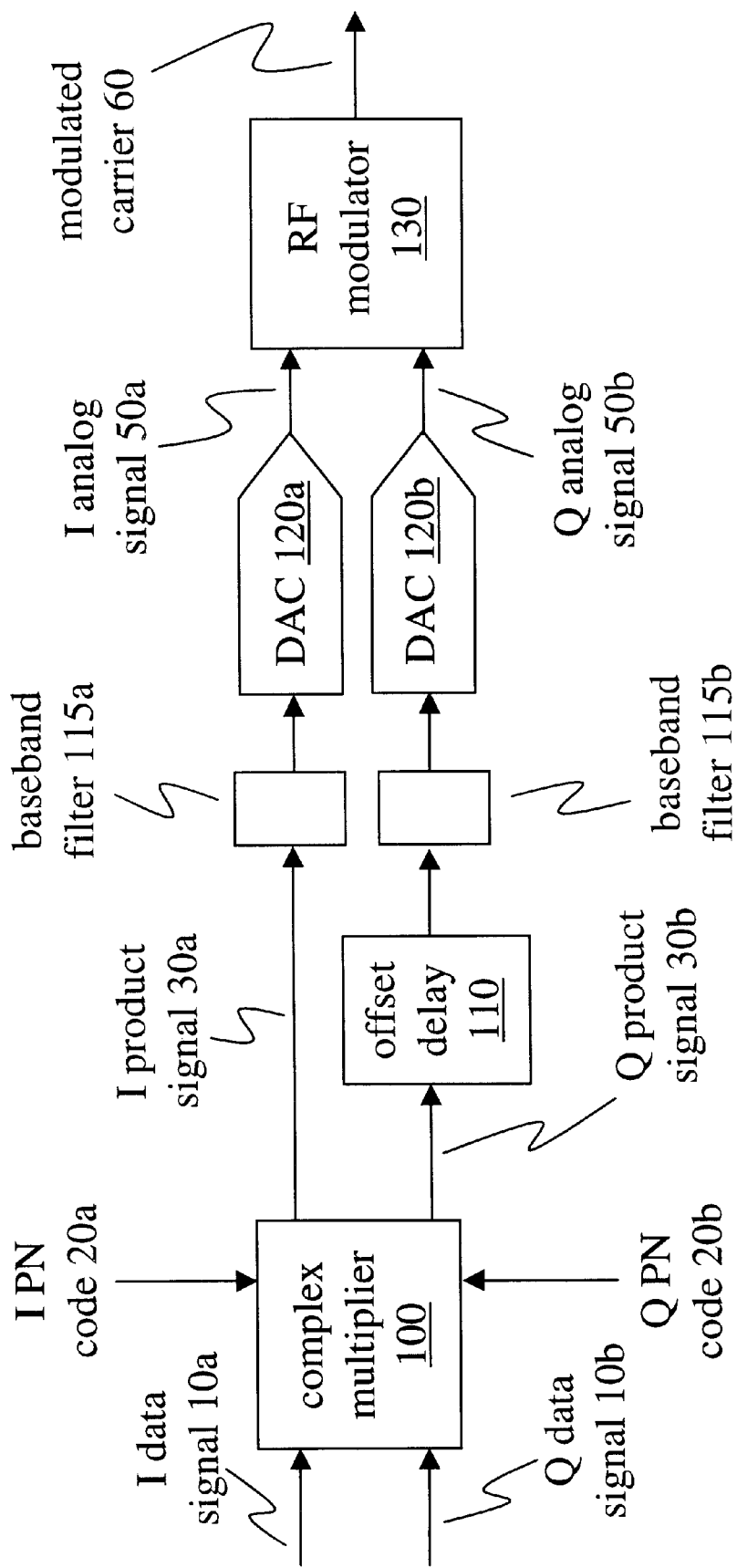
FIG. 1 is a block diagram of an OQPSK spreading modulator.

FIG. 1 shows a block diagram of an OQPSK spreading modulator suitable for a DSSS transmitter such as a CDMA cellular telephone. In this example, data signals 10a and 10b are digital signals that represent two real-valued components of a complex data signal (e.g. the real and imaginary components), PN codes 20a and 20b are digital signals that represent two real-valued components of a complex spreading signal of predetermined period (e.g. the real and imaginary components), and each of these four digital input signals comprises one or more binary-valued signal lines (i.e. each signal line carries the value 0 or 1 at any given instant).

Figure 2:
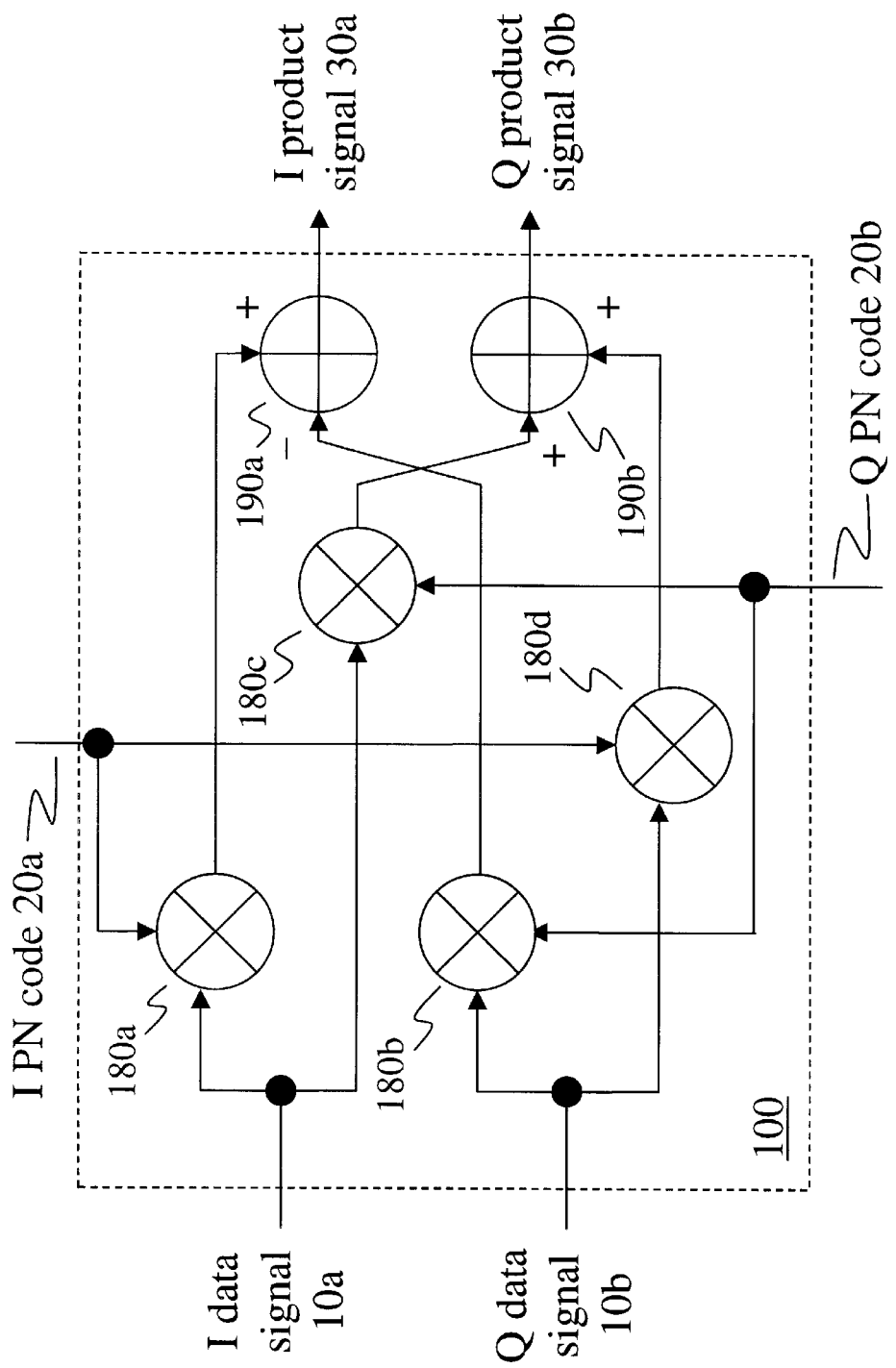
FIG. 2 is a block diagram of a complex multiplier.

Complex multiplier 100 receives the two complex signals described above and produces a complex product signal having real components 30a and 30b. FIG. 2 shows a block diagram of a circuit suitable for complex multiplier 100 which comprises four real multipliers 200a–d and two real adders 210a and 210b. The output signals 30a and 30b of this circuit may be expressed respectively as $$I \text{ product } 30a = (I \text{ data } 10a \times I \text{ PN code } 20a) - (Q \text{ data } 10b \times Q \text{ PN code } 20b), \quad (1a)$$

$$Q \text{ product } 30b (I \text{ data } 10a \times Q \text{ PN code } 20b) + (Q \text{ data } 10b \times I \text{ PN code } 20a). \quad (1b)$$

Consequently, the complex product signal outputted by complex multiplier 100 may be expressed in complex notation as $$\text{complex product} = I \text{ product } 30a + (j \times Q \text{ product } 30b),$$

where j is the square root of −1, or in phasor notation as $$\text{complex product} = A \angle \phi,$$

where $$A = \sqrt{((I \text{ product } 30a)^2 + (Q \text{ product } 30b)^2)}$$

is the magnitude and $$\phi = \tan^{-1}(Q \text{ product } 30b / I \text{ product } 30a)$$

is the phase angle of the complex product.

Gain factors may also be used in some applications. For example, one gain factor may be applied to the I component inputted to the complex multiplier while a different gain factor is applied to the Q input component. In other implementations, the same gain factor may be applied to each input component, or gain factors may be applied to the output components instead.

If OQPSK modulation is desired, a delay may be inserted into one of the digital signal paths. For example, FIG. 1 shows how an offset delay block 110 may be inserted into the path of Q product signal 30b for this purpose. If no such offset is desired (i.e. if QPSK modulation is desired), offset delay block 110 may be omitted (i.e. short-circuited).

Filtering of the signals (e.g. for spectral or pulse shaping) may also be performed along one or more of the analog and digital signal paths. For example, baseband filters 115a and 115b may be used to filter the digital baseband signals inputted to DACs 120a and 120b, respectively, as shown in FIG. 1.

Figure 3:
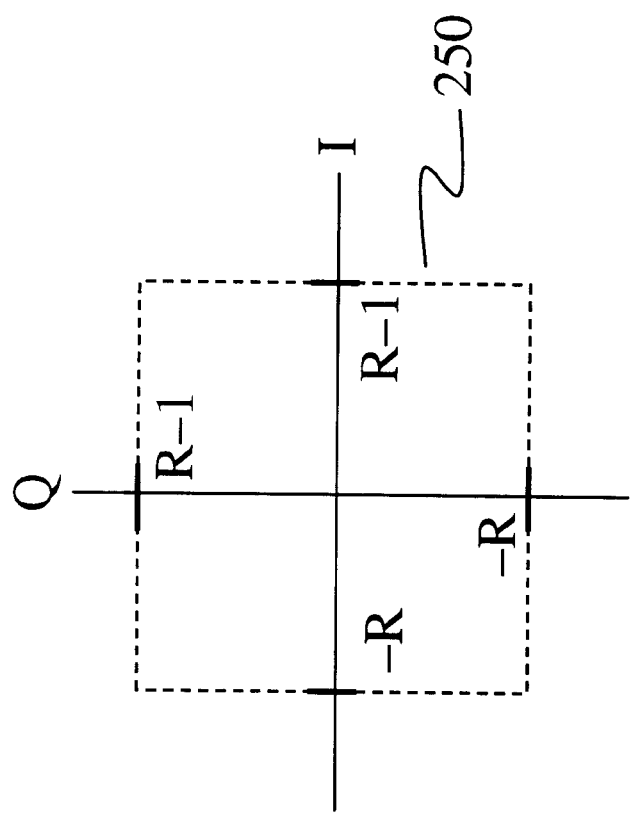
FIG. 3 shows an example of the output space of an complex analog signal produced by a pair of DACs.

Digital-to-analog converters (DACs) 120a and 120b each receive one component of the complex digital signal to be transmitted and output a corresponding analog signal component, wherein the amplitude of the outputted analog signal component (signal 50a or 50b in FIG. 1) corresponds to the value of the inputted digital signal component (signal 30a or 30b, respectively, in FIG. 1). In one example, the output range of each DAC 120 has $2^n$ steps of equal magnitude, with the maximum and minimum values of the inputted digital signal being mapped to the output analog values which are R−1 steps above and R steps below DC, respectively (where n is the width of the inputted digital signal in bits and R is equal to $2^n/2$). FIG. 3 shows the output space of the complex analog signal produced by DACs 120a and 120b for this example, where the output of DAC 120a is mapped to the I axis, the output of DAC 120b is mapped to the Q axis, and dotted line 250 represents the limits of this space in the complex plane. Note that any suitable input-output mapping may be used—for example, the minimum and maximum values of the digital input may be mapped to the analog values 0 and $2^n-1$ instead—so long as any DC offset is removed or compensated as necessary. Similarly, the relation among the magnitudes of the steps in the output range of one or both DACs may follow a linear, logarithmic or some other form of progression instead of a uniform one as described above.

Figure 4:
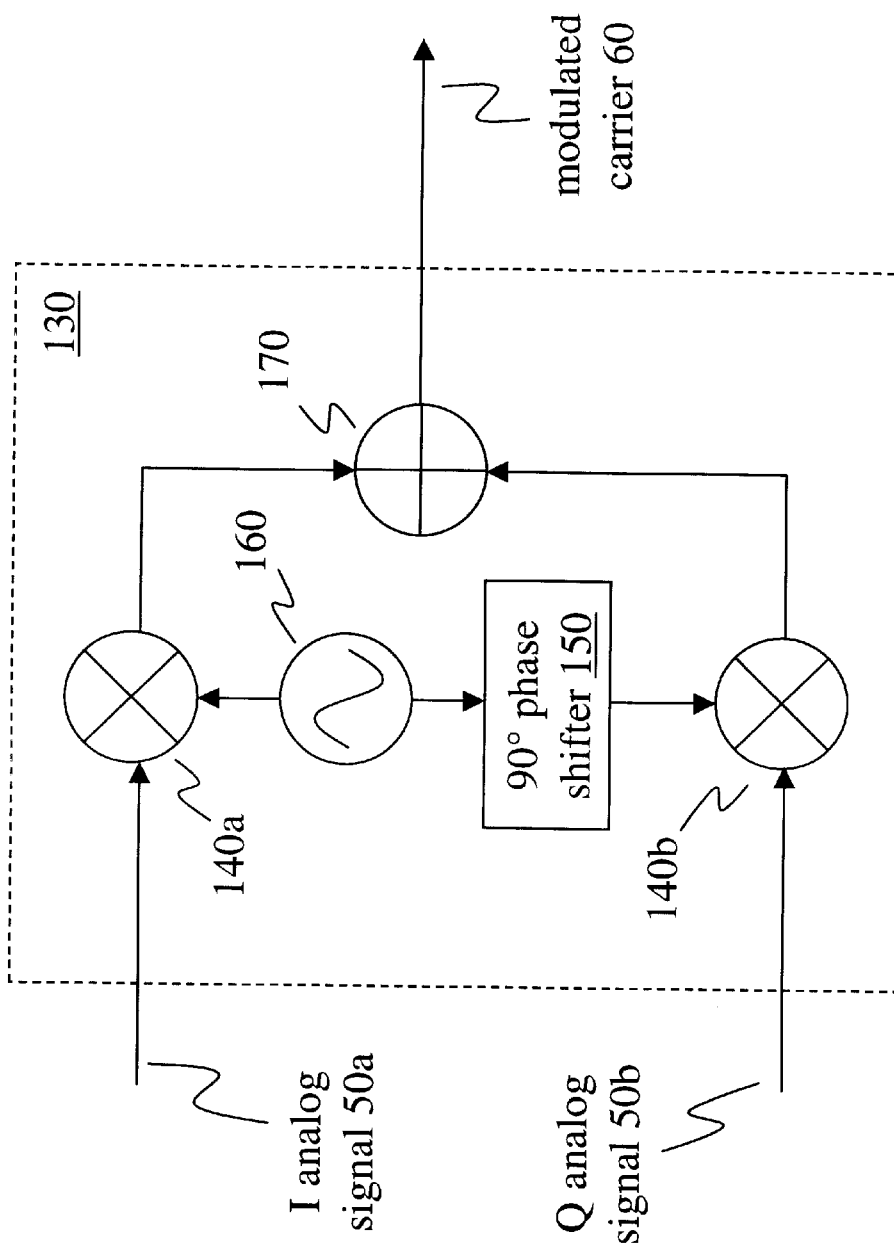
FIG. 4 is a block diagram of a quadrature modulator.

Analog signal components 50a and 50b are modulated onto an RF carrier in RF modulator 130 to produce modulated carrier 60. FIG. 4 shows a block diagram of a circuit suitable for RF modulator 130 which comprises carrier oscillator 160, mixers 140a and 140b, 90-degree phase shifter 150, and adder 170. In this example, modulated carrier 60 may be expressed as $$\text{modulated carrier } 60 = (I \text{ analog signal } 50a \times \cos \omega_c t) + (Q \text{ analog signal } 50b \times \sin \omega_c t), \quad (2)$$

where ($\omega_c$ represents the angular frequency of the carrier signal produced by oscillator 160 (in radians/s) and t represents time (in s)

Figure 5:
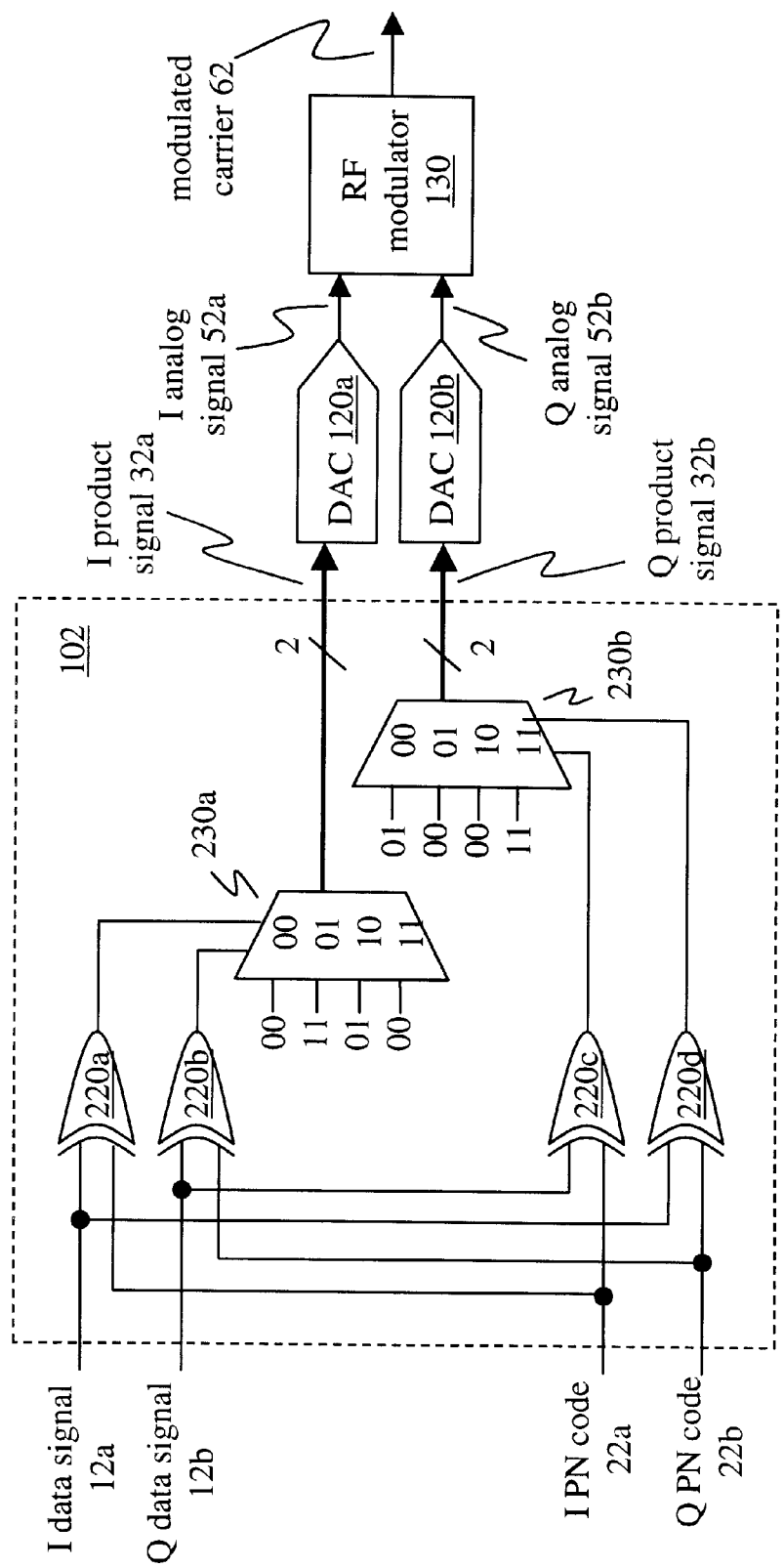
FIG. 5 is a circuit diagram of a complex multiplier for receiving binary inputs.

For the particular case where the input signals 10a, 10b, 20a, and 20b are all binary-valued (here labeled 12a, 12b, 22a, 22b, respectively), the modulator of FIG. 5 includes a circuit diagram for a suitable implementation 102 of complex multiplier 100 wherein the values 0 and 1 of the input signals represent the analog values +1 and −1, respectively (i.e. each input signal represents a polar nonreturn-to-zero or NRZ symbol stream). This implementation of a complex multiplier comprises four XOR gates 220a–d and two four-to-one two-bit-wide multiplexers 230a and 230b. At the output of the multiplier 102, the possible values of the two-bit-wide digital product signals 32a and 32b (corresponding to signals 30a and 30b, respectively) are 00, 01, 11 which represent the analog values 0, +1, and −1, respectively. TABLE 1 shows the possible values of input signals 12a, 12b, 22a, and 22b and the corresponding values of product signals 32a and 32b, along with the analog values (in parentheses) which these signals represent. Expressions describing the product signals 32a and 32b may be obtained by modifying expressions (1a) and (1b) above to include a constant gain factor of 0.5:

$I$ product 32a=0.5×[($I$ data 12a×$I$ PN code 22a)−($Q$ data 12b×$Q$ PN code 22b)], $Q$ product 32b=0.5×[($I$ data 12a×$Q$ PN code 22b)+($Q$ data 12b×$I$ PN code 22a)].

TABLE 1

| I data signal 12a | Q data signal 12b | I PN code 22a | Q PN code 22b | I product signal 32a | Q product signal 32b |
|---|---|---|---|---|---|
| 0 (+1) | 0 (+1) | 0 (+1) | 0 (+1) | 00 (0) | 01 (+1) |
| 0 (+1) | 0 (+1) | 0 (+1) | 1 (−1) | 01 (+1) | 00 (0) |
| 0 (+1) | 0 (+1) | 1 (−1) | 0 (+1) | 11 (−1) | 00 (0) |
| 0 (+1) | 0 (+1) | 1 (−1) | 1 (−1) | 00 (0) | 11 (−1) |
| 0 (+1) | 1 (−1) | 0 (+1) | 0 (+1) | 01 (+1) | 00 (0) |
| 0 (+1) | 1 (−1) | 0 (+1) | 1 (−1) | 00 (0) | 11 (−1) |
| 0 (+1) | 1 (−1) | 1 (−1) | 0 (+1) | 00 (0) | 01 (+1) |
| 0 (+1) | 1 (−1) | 1 (−1) | 1 (−1) | 11 (−1) | 00 (0) |
| 1 (−1) | 0 (+1) | 0 (+1) | 0 (+1) | 11 (−1) | 00 (0) |
| 1 (−1) | 0 (+1) | 0 (+1) | 1 (−1) | 00 (0) | 01 (+1) |
| 1 (−1) | 0 (+1) | 1 (−1) | 0 (+1) | 00 (0) | 11 (−1) |
| 1 (−1) | 0 (+1) | 1 (−1) | 1 (−1) | 01 (+1) | 00 (0) |
| 1 (−1) | 1 (−1) | 0 (+1) | 0 (+1) | 00 (0) | 11 (−1) |
| 1 (−1) | 1 (−1) | 0 (+1) | 1 (−1) | 11 (−1) | 00 (0) |
| 1 (−1) | 1 (−1) | 1 (−1) | 0 (+1) | 01 (+1) | 00 (0) |
| 1 (−1) | 1 (−1) | 1 (−1) | 1 (−1) | 00 (0) | 01 (+1) |

Figure 6B:
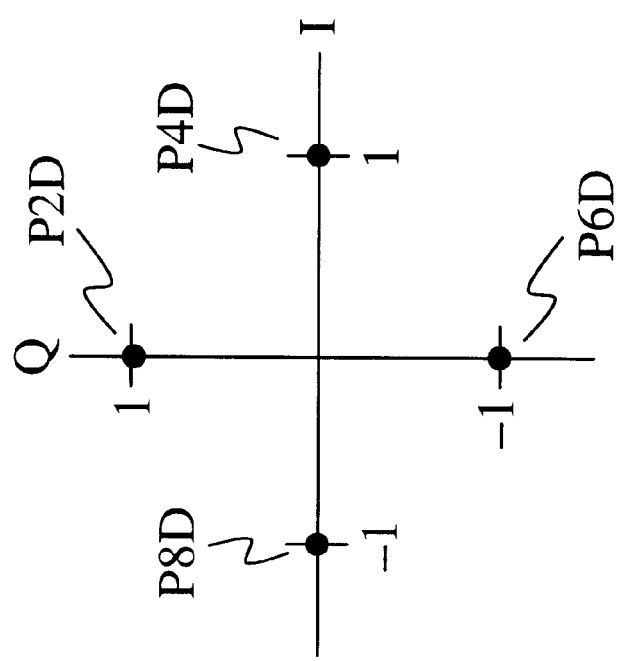
FIG. 6B shows the constellation of the signal of FIG. 6A after passing through the complex multiplier according to FIG. 5.
Figure 6A:
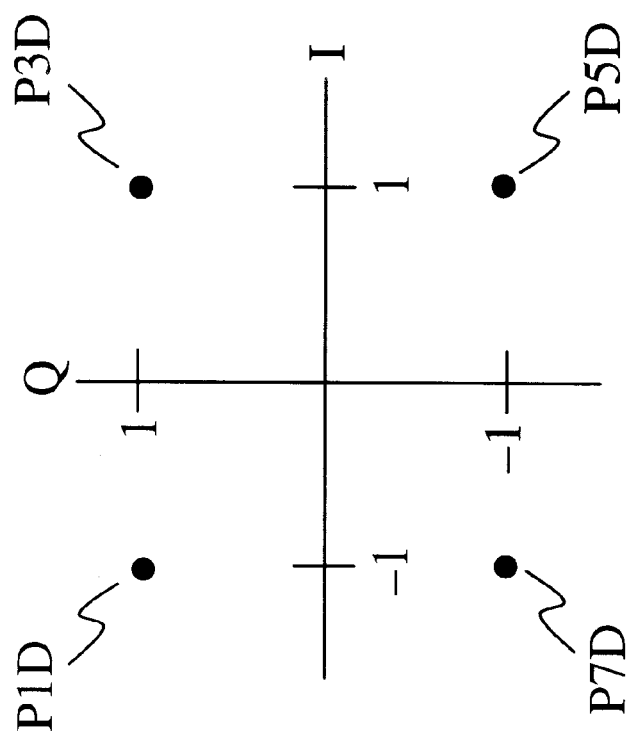
FIG. 6A shows a constellation for a complex data signal.
Figure 9B:
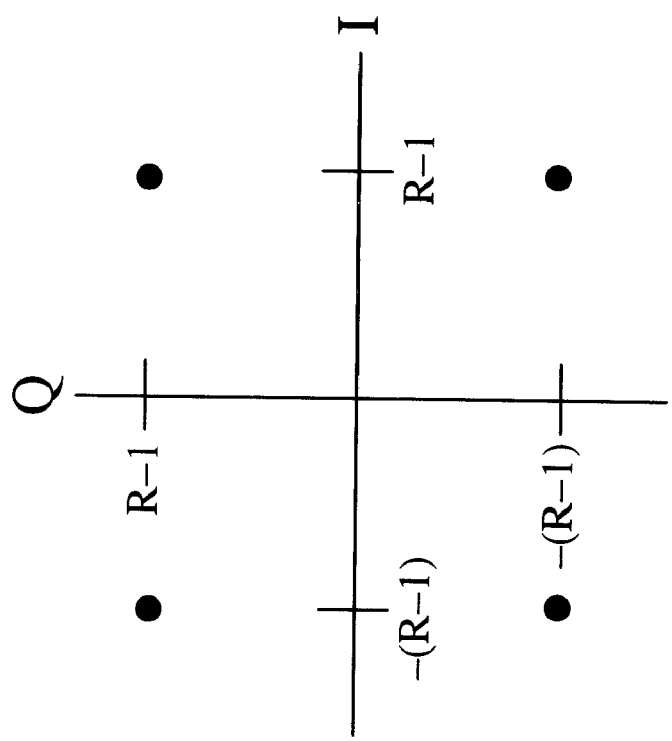
FIG. 9B shows a constellation for a complex analog signal produced from a rotated signal.
Figure 9A:
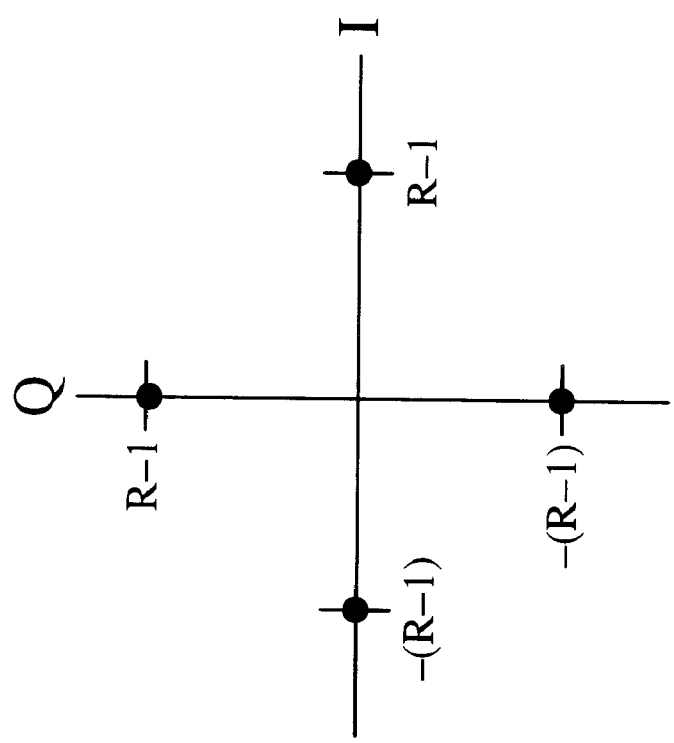
FIG. 9A shows a constellation for a complex analog signal.

FIG. 6A shows the constellation of possible signal vectors in the complex signals represented by input signal component pairs 12a and 12b and 22a and 22b, wherein each signal vector is represented by one among the points P1D, P3D, P5D, and P7D. FIG. 6B shows the constellation of possible signal vectors in the complex signal represented by product signals 32a and 32b, wherein each signal vector is represented by one among the points P2D, P4D, P6D, and P8D. By comparing these two figures, it may be seen that one effect of the complex multiplication is to rotate the constellation by 45 degrees. FIG. 9A shows the constellation of possible signal vectors in the complex signal comprising analog signal components 52a and 52b as produced by DACs 120a and 120b, respectively, in response to digital input signals 32a and 32b (in this example, we assume that DACs 120a and 120b map the digital input values +1 and −1 to the analog output values (R−1) and −(R−1), respectively, without distortion).

Figure 7:
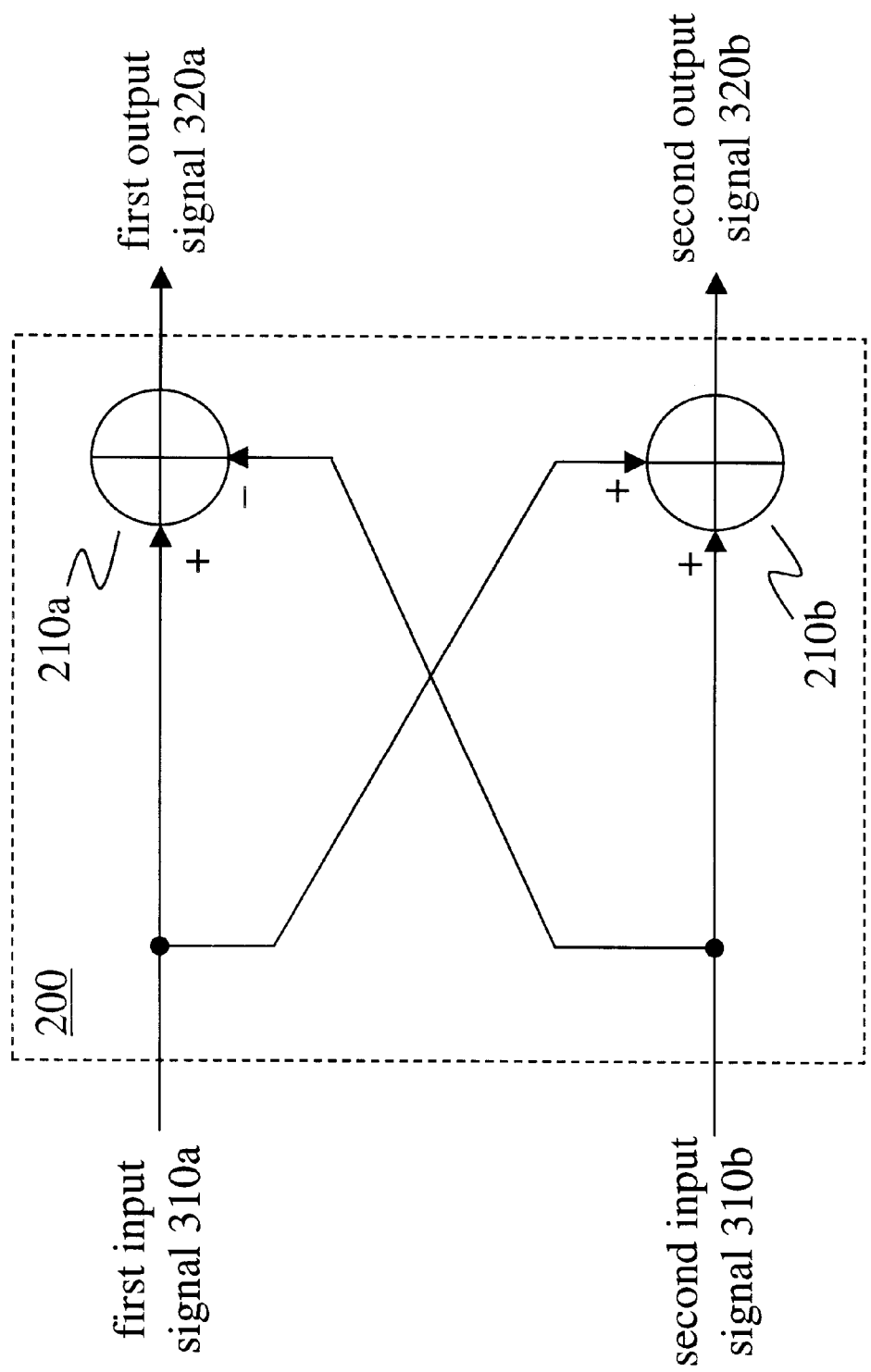
FIG. 7 is a circuit diagram of a phase rotator according to a first embodiment of the invention.

As shown in FIG. 7, a phase rotator 200 according to a first embodiment of the invention receives two input signals 310a and 310b, which are real-valued components of a complex input signal (e.g. signal 310a represents the real component and signal 310b represents the imaginary component, or vice versa). Adders 210a and 210b are arranged such that one real component 320a of a complex output signal is the difference of the input signal components 310a and 310b, and another real component 320b of the complex output signal is the sum of the signals 310a and 310b. If we label the input signals 310a and 310b as I and Q, respectively, then the output signals 320a and 320b may be expressed as output signal 320a=I−Q, output signal 320b=I+Q.

By applying the well-known formula for the angle θ between two vectors A and B, $\theta = \cos^{-1}[(A \cdot B)/(|A| |B|)]$, where <·> indicates the vector dot product and <|·|> indicates the vector norm, we find that the angle α between the complex input signal having components 310a and 310b and the complex output signal having components 320a and 320b is $$\alpha = \cos^{-1} \frac{\sqrt{2}}{2} = \frac{\pi}{4} \text{rad} = 45°.$$

Figure 8:
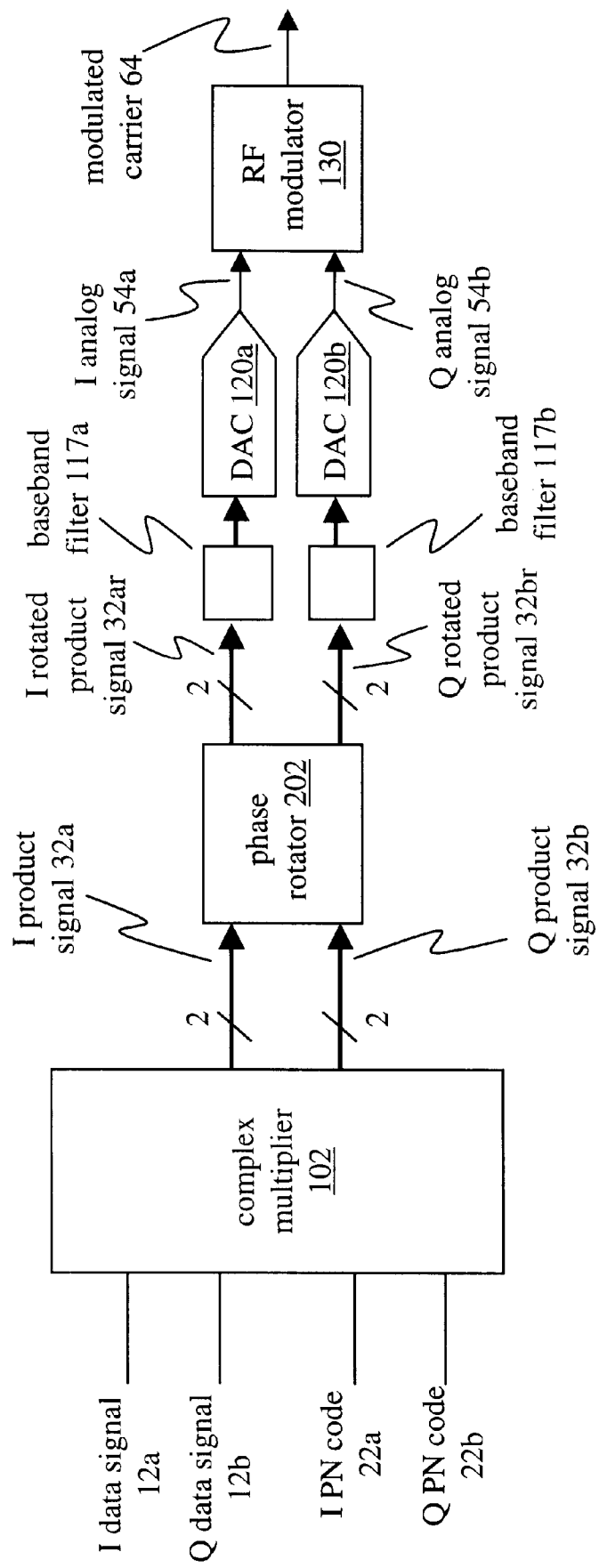
FIG. 8 is a block diagram of an QPSK spreading modulator for receiving binary inputs that includes a phase rotator according to a second embodiment of the invention.

FIG. 8 shows a modified version of the modulator illustrated in FIG. 5, wherein a phase rotator 202 according to a second embodiment of the invention receives the complex product signal from complex multiplier 102 (comprising components 32a and 32b) and outputs a complex rotated product signal (comprising components 32ar and 32br) to DACs 120a and 120b. FIG. 9B shows the constellation of possible signal vectors in the complex signal comprising analog signal components 54a and 54b as produced by DACs 120a and 120b, respectively, in response to digital input signals 32ar and 32br (with the same mapping as in the description of FIG. 9A above).

Figure 10:
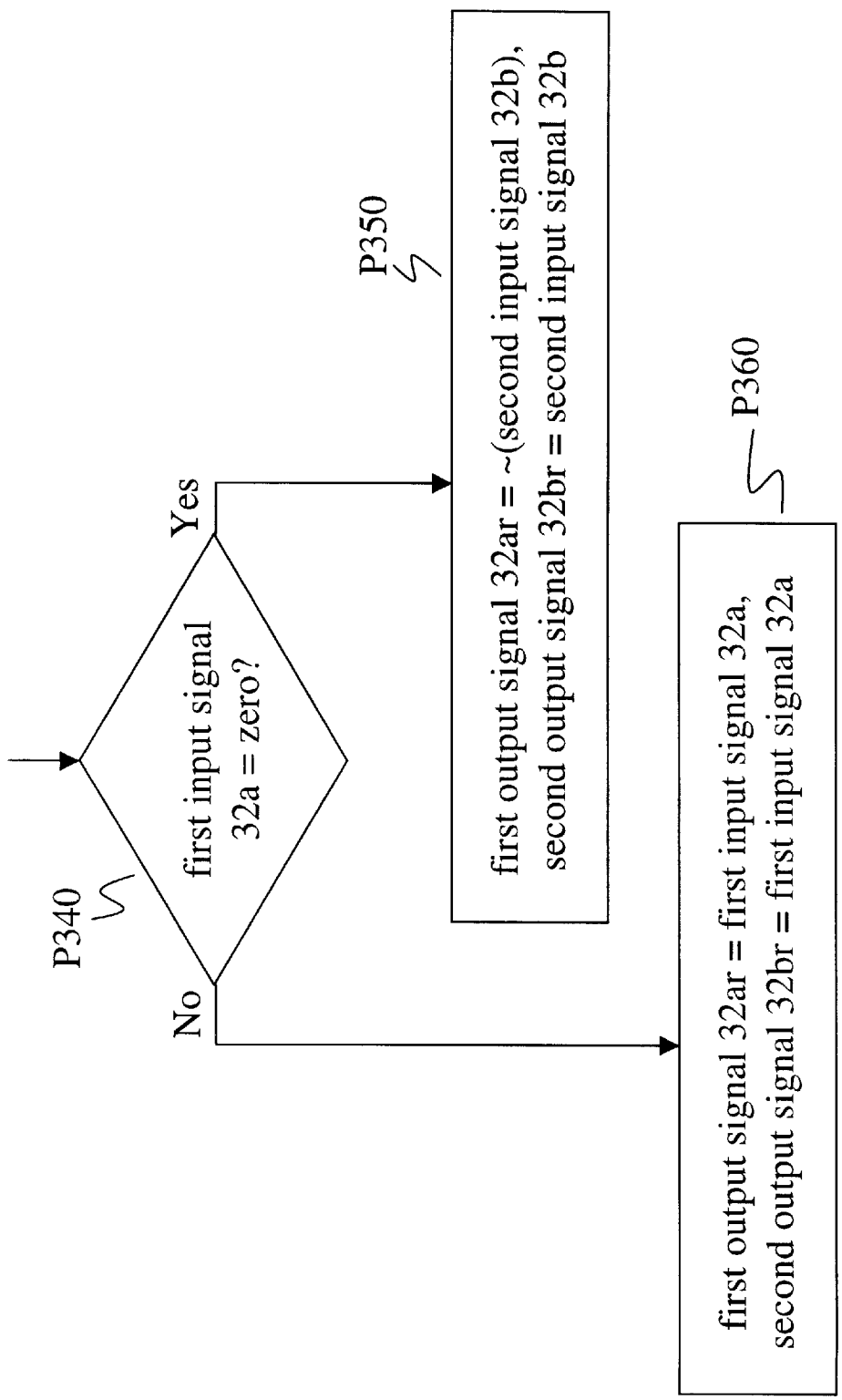
FIG. 10 is a flow chart describing the operation of a phase rotator according to a second embodiment of the invention.
Figure 11:
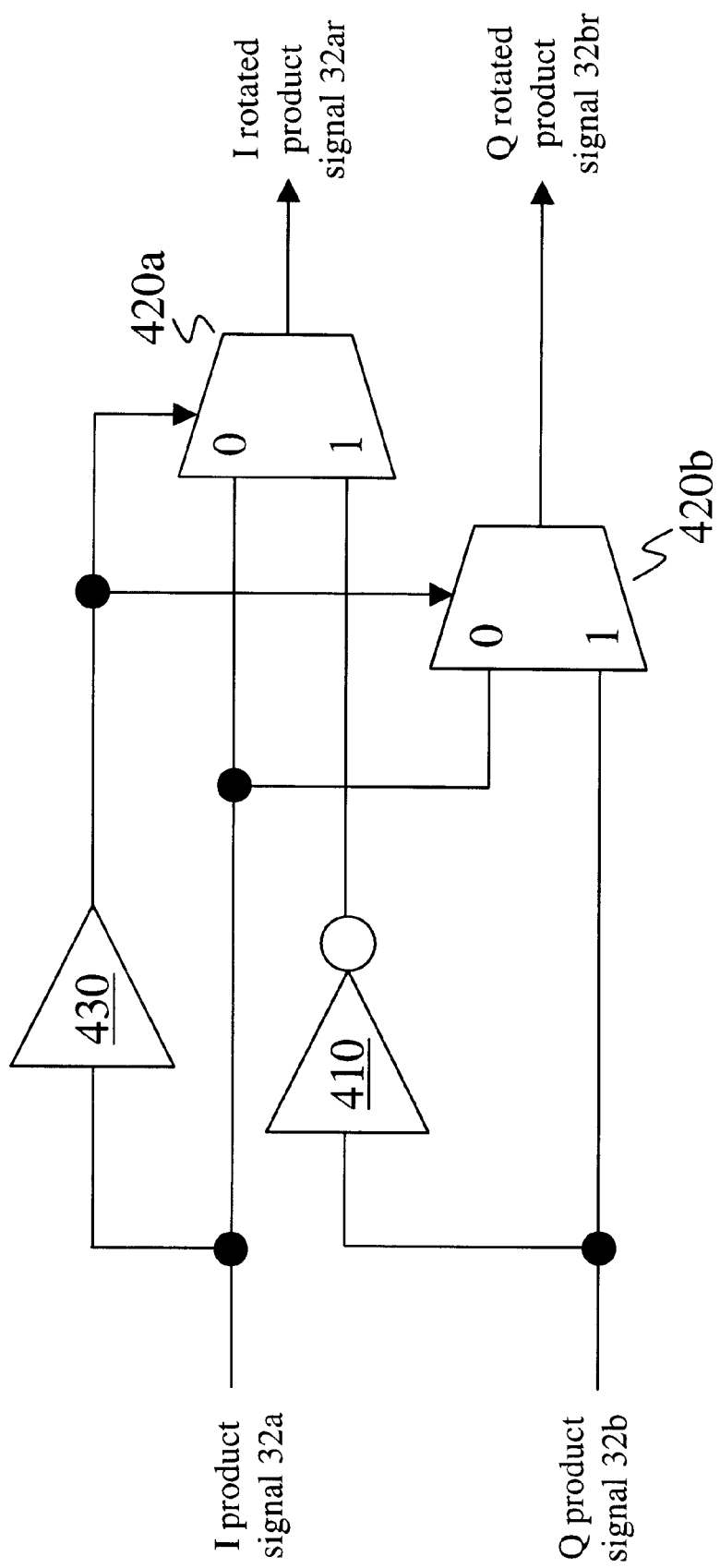
FIG. 11 is a circuit diagram of a phase rotator according to the second embodiment of the invention.

By comparing FIGS. 9A and 9B, one of ordinary skill in the art will recognize that because the average power of a bandpass waveform is proportional to the square of the magnitude of the signal vector, the average power of modulated carrier 64 in FIG. 9B will be twice the average power of modulated carrier 62 in FIG. 9A. Note that the constellation of FIG. 9B is similar to the constellation of FIG. 6A, which shows the possible signal vectors of the data signals 12a and 12b and the PN codes 22a and 22b before complex multiplication. In compensating for the rotation caused by the complex multiplication operation, therefore, application of the phase rotator has increased the power of the resulting modulated carrier by a factor of two. FIG. 10 shows one example of how phase rotator 202 according to the second embodiment of the invention may be implemented via the logical operations of a test P340 and mapping functions P350 and P360 performed on the ternary-valued signals 32a and 32b. FIG. 11 shows how phase rotator 202 may be implemented with a circuit having an inverter 410, two multiplexers 420a and 420b, and a zero comparator 430 which outputs a binary low or '0' signal if the input signal is nonzero and a binary high or '1' signal if the input is zero.

Figure 12:
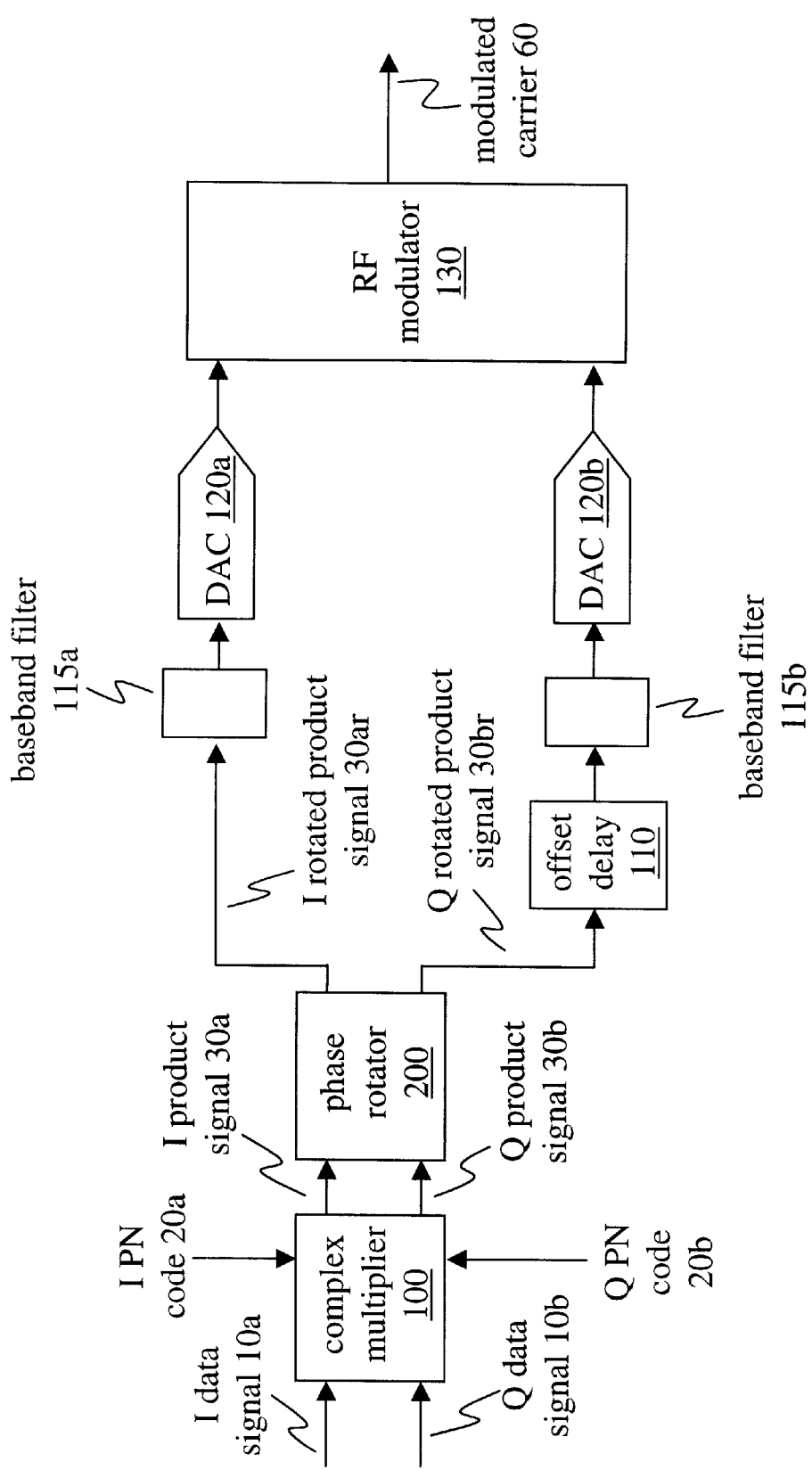
FIG. 12 is a block diagram of an OQPSK spreading modulator including a phase rotator according to an embodiment of the invention.

In a more general case, a phase rotator 200 according to the first embodiment of the invention may be inserted into the complex signal path of the modulator of FIG. 1, as shown in FIG. 12, without regard to whether the values of the digital signals inputted to the DACs are limited to, e.g., −1, 0, and +1 as in the modulator of FIG. 5. In several existing and proposed CDMA schemes, for example, the I and Q data signals may represent traffic and control signals, respectively, with different gain factor ratios being applied to the signals at different data rates. These schemes include those defined in section 2.1.2.3.3.2 ('Code Channel Output Power for reverse Traffic Channel with Radio Configuration 3, 4, 5, or 6') of the cdma2000 (also known as IS-2000) standards document 'Physical Layer Standard for cdma2000 Spread Spectrum Systems,' published by the Telecommunications Industry Association (TIA), Arlington, Va. (document ref. no. TR45/PN-4428, to be published as IS-2000-2), and Table 2.1.2.3.3.2-1 ('Reverse Link Nominal Attribute Gain Table') referenced therein. In such an application, the I and Q data signals may pass through one or more filters and/or gain stages before reaching phase rotator 200. Even if the data signals are binary-valued, therefore, the digital signals inputted to the phase rotator may no longer be binary- or even ternary-valued, and the constellation of their possible signal vectors may no longer lie along the I and Q axes.

Figure 12C:
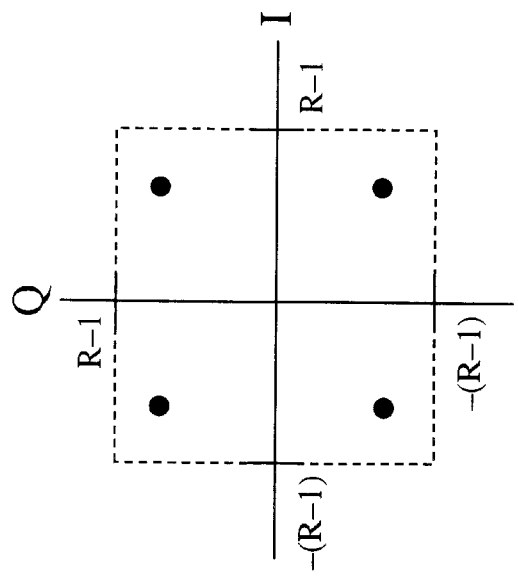
FIG. 12C shows a constellation for a complex analog signal produced from a rotation of the input signal of FIG. 10B.
Figure 12B:
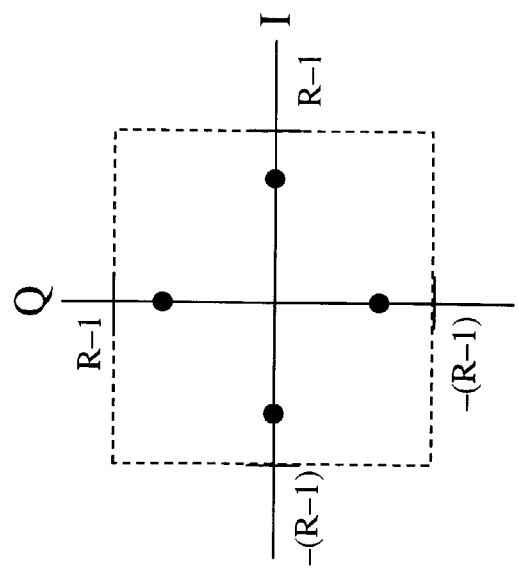
FIG. 12B shows a constellation for a complex analog signal produced from an input signal having an amplitude $(\sqrt{2})/2$ times the amplitude of the input signal of FIG. 10A.
Figure 12A:
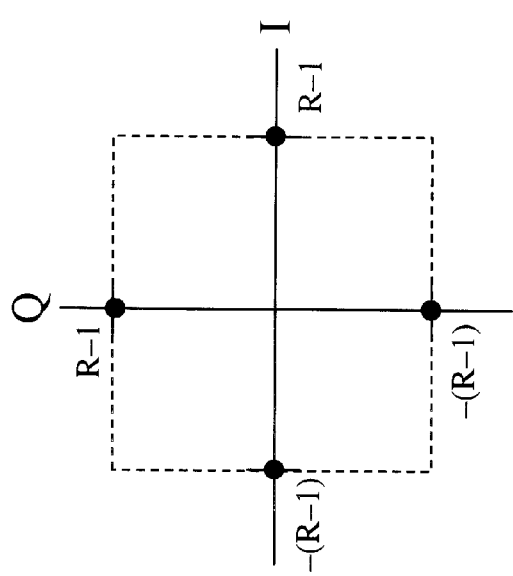
FIG. 12A shows a constellation for a complex analog signal produced from an input signal.

More generally, a phase rotator according to an embodiment of the invention may be used in conjunction with one or more DACs such that a desired signal power may be maintained while a possibility of saturating the DACs is reduced. In one example of such a use, it is desired to obtain a complex output signal with power P near to R−1 by using a pair of DACs having the output space shown in FIG. 3 (such as DACS 120a and 120b described above). FIG. 12A shows the constellation of an output signal having power substantially equal to R−1 as produced from a complex input signal having a constellation as shown in FIG. 6B (wherein the dotted box indicates the limits of the output space of the DACs as in FIG. 3). Although this output signal meets the power requirement, the DACs are being driven to saturation, and the spectrum of the output signal may therefore be degraded.

By rotating the complex input signal before it reaches the DACs, an output signal having the same power may be obtained while avoiding spectral degradation. This scheme may be applied by reducing the amplitude of the input signal by a factor of √2 and also phase rotating the signal before inputting it to the DACs. FIG. 12B shows how inputting this signal to the DACs without rotation will cause the output signal to have an amplitude of (R−1)/√2. After the signal is rotated, the output of the DACs becomes as shown in FIG. 12C. While a signal of the desired power R−1 is obtained as in FIG. 12A, in this case the dynamic range of the DACs is used more efficiently such that the danger of saturation and spectral degradation is greatly reduced. In another implementation, the phase rotator may include the capacity to perform such amplitude compensation internally.

Note that the advantages of phase rotation as described above may not be obtained with all possible input signals. Specifically, a signal vector will suffer a reduction in power (or, alternatively, may bring the DACs closer to saturation) if rotation would bring its phase angle closer to one among the set {0, π/2, π, or 3π/2 radians}.

Figure 13:
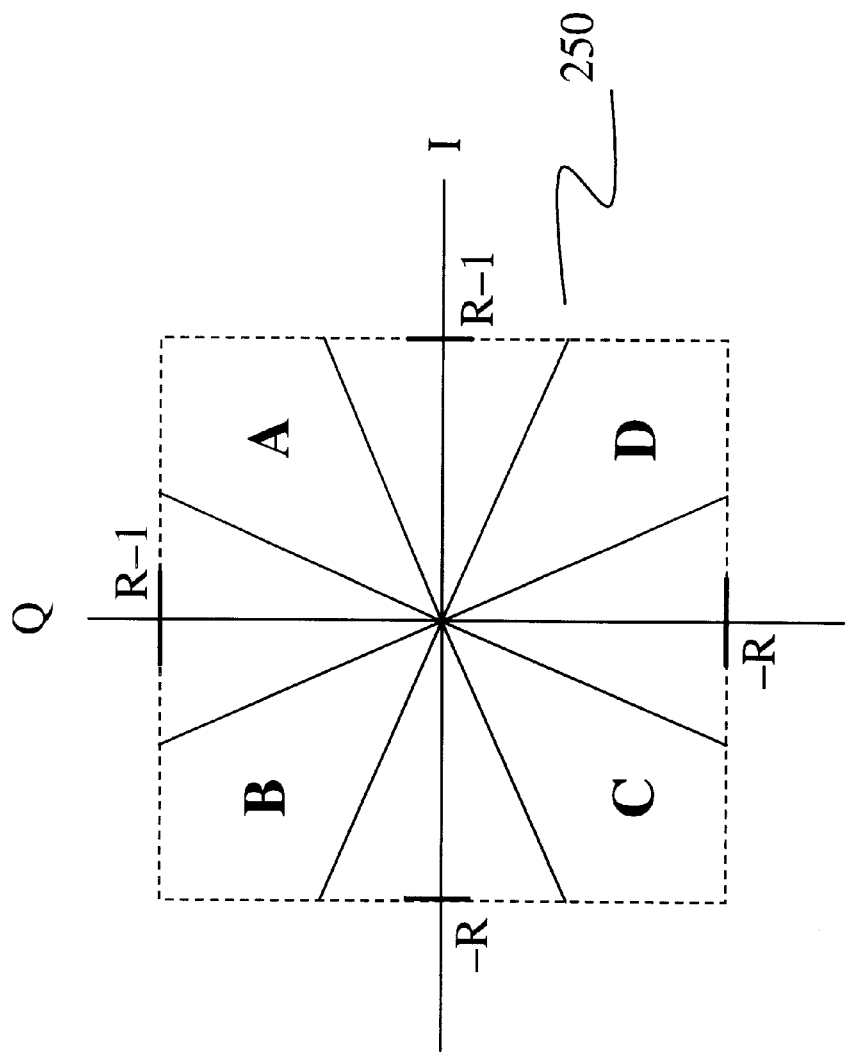
FIG. 13 shows an example of the output space of a complex analog signal produced by a pair of DACs.

By way of example, FIG. 13 shows the output space 250 of a complex analog signal produced a pair of DACs having the characteristics of DACs 120a and 120b as described above. Regions A–D in this figure are bounded by rays having phase angles of (2h+1)π/8 radians, where h is an integer from 0 to 7. One may see that applying a rotation of 45 degrees (π/4 radians) to a signal vector that originally falls within one of the regions A–D will cause the vector to move outside of the region and closer to the I or Q axis, thus reducing its power and also bringing the vector closer to the limits of the output space of the DACs. Because the phase angle of a vector may be expressed as $\tan^{-1}(Q/I)$, it follows that the ratio of the amplitude of the Q data signal to the amplitude of the I data signal should not fall within either the range (tan π/8 – tan 3π/8) or the range (tan 5π/8 – tan 7π/8).

Figure 14:
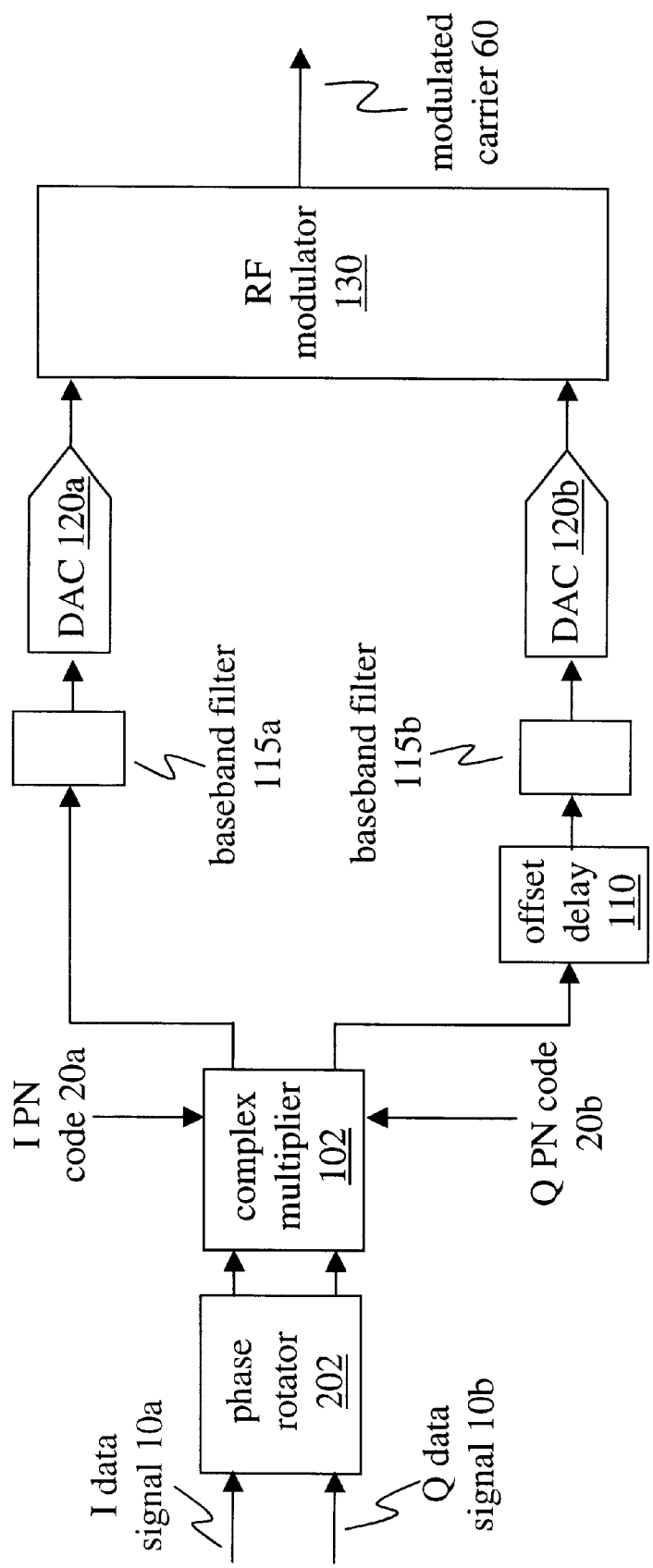
FIG. 14 is a block diagram of an alternate arrangement for an OQPSK spreading modulator including a phase rotator according to an embodiment of the invention.
Figure 15:
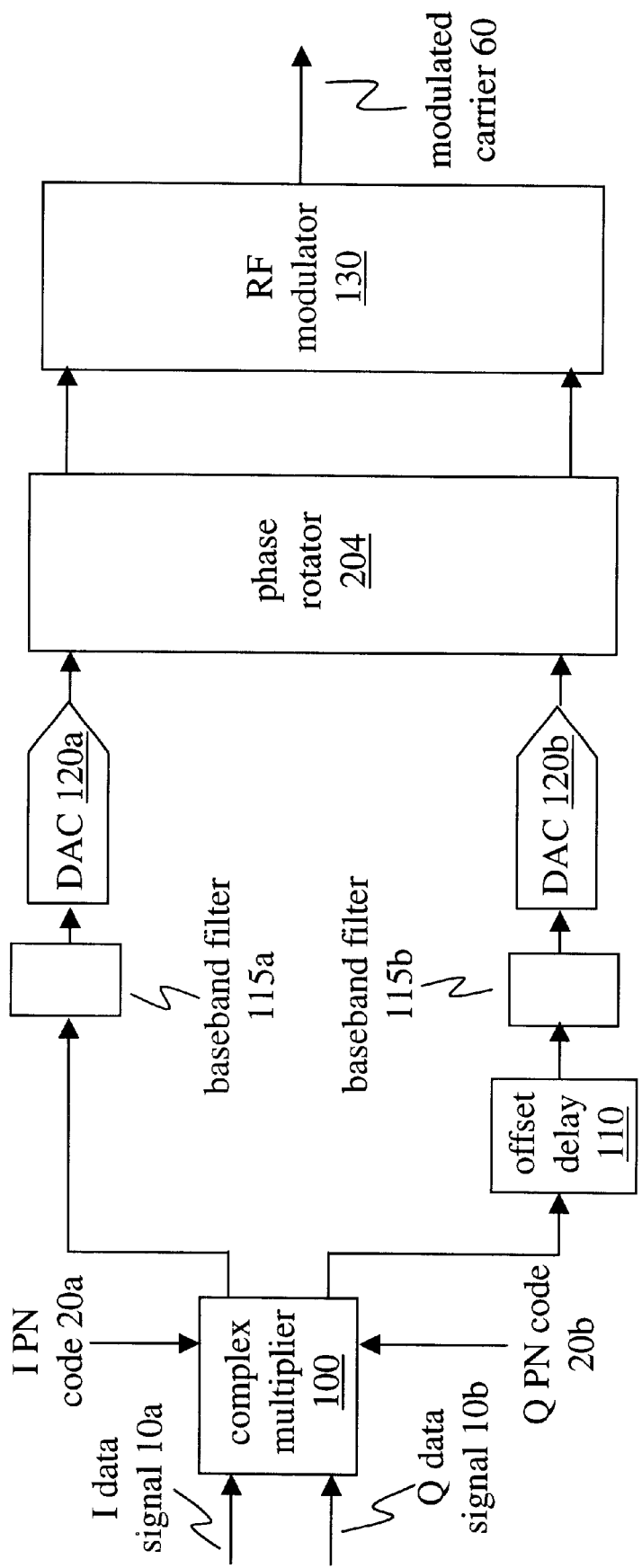
FIG. 15 is a block diagram of an OQPSK spreading modulator including a phase rotator according to an embodiment of the invention applied in the analog domain.

Because phase rotation is a linear operation, a phase rotator according to an embodiment of the invention may be inserted into the complex signal path at any point. For example, the data signals 10a and 10b may be rotated by a phase rotator 202 before complex multiplication instead of afterward, as shown in FIG. 14. Although phase rotation is performed in the digital domain in the applications described above, a phase rotator 204 according to an embodiment of the invention which performs suitable analog operations at adders 210a and 210b may also be applied after the DACs (i.e. in the analog domain) if desired, as shown in FIG. 15.

In general, rotation of a two-dimensional vector may be represented by the matrix expression Ax=b, where $$A = \begin{matrix} \cos\alpha & -\sin\alpha \\ \sin\alpha & \cos\alpha \end{matrix}, x = \begin{matrix} I \\ Q \end{matrix}, b = \begin{matrix} Ir \\ Qr \end{matrix}; \quad (3)$$

α indicates the angle of rotation; I and Q represent the real and imaginary components of the complex signal inputted to the rotator, respectively; and Ir and Qr represent the real and imaginary components of the complex rotated signal outputted by the rotator, respectively. Phase rotator 200 as illustrated in FIG. 7, for example, rotates and scales the input signal according to the following rotation matrix $A_1$:

$$A_1 = \begin{matrix} +1 & -1 \\ +1 & +1 \end{matrix},$$

where the angle of rotation is 45° and the matrix is normalized (i.e. scaled) by multiplying it by the square root of 2.

Figure 16:
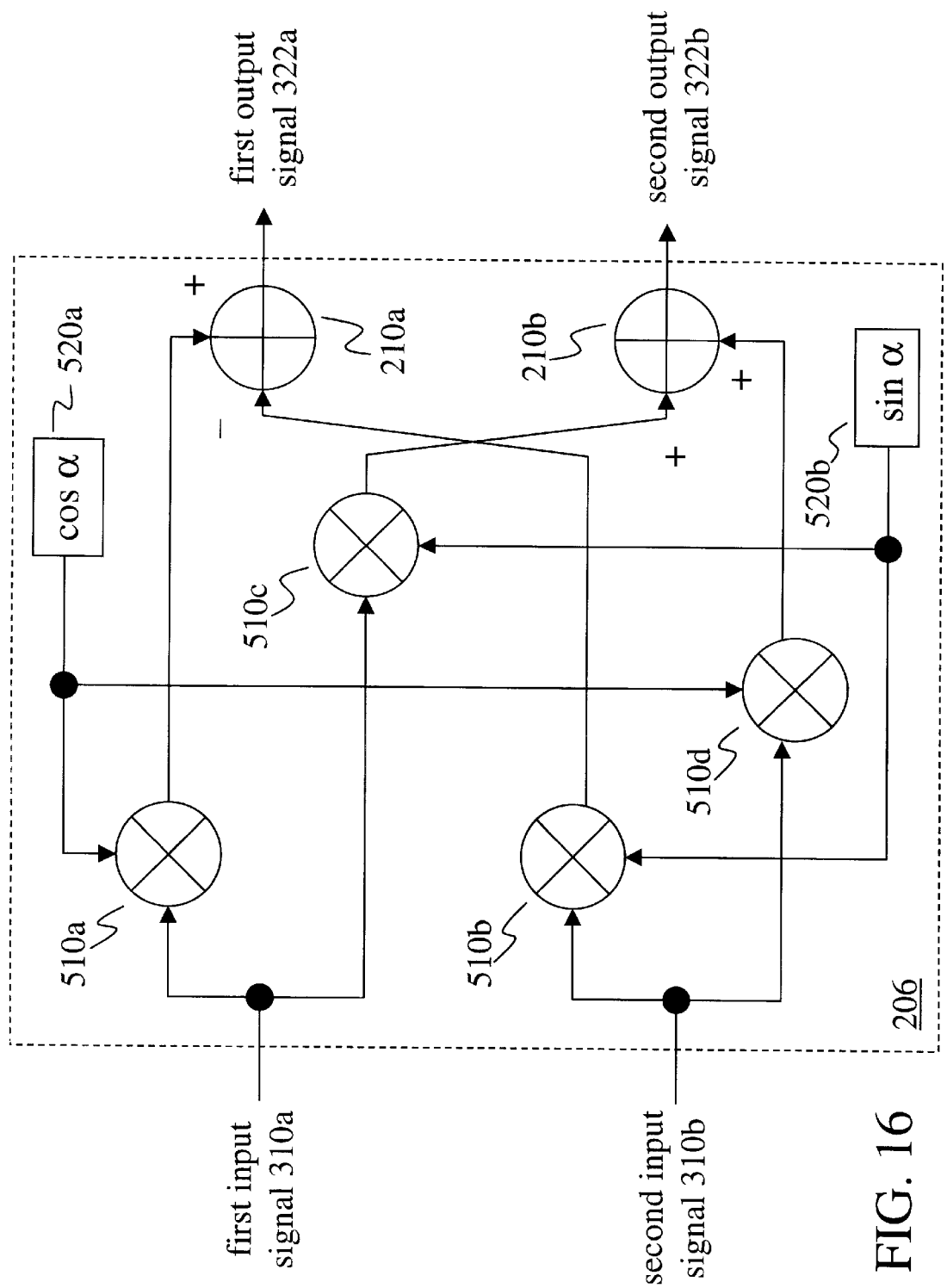
FIG. 16 is a circuit diagram of a phase rotator according to a third embodiment of the invention.

Note that the invention is not limited to rotations of 45 degrees, as the benefits of increased power and improved spectrum as described above may apply to any angle of rotation. Phase rotators according to additional embodiments of the invention may therefore be designed and implemented by applying the principles of rotation matrices. FIG. 16 shows one example of a circuit diagram for a phase rotator 206 which implements the general rotation expression (3) and includes four multipliers 510a–d, two adders 210a and 210b, and two constant factors cos α (520a) and sin α (520b), where α is the angle of rotation (in radians) between the complex input signal 310a,b and the complex output signal 322a,b. (The constant factors may be hard-wired or, alternatively, they may be reprogrammable.) Such a rotator may be used, for example, in place of phase rotator 200, 202 or 204 in a system according to FIG. 12, 14, or 15, respectively, to allow rotation by any angle.

Figure 17:
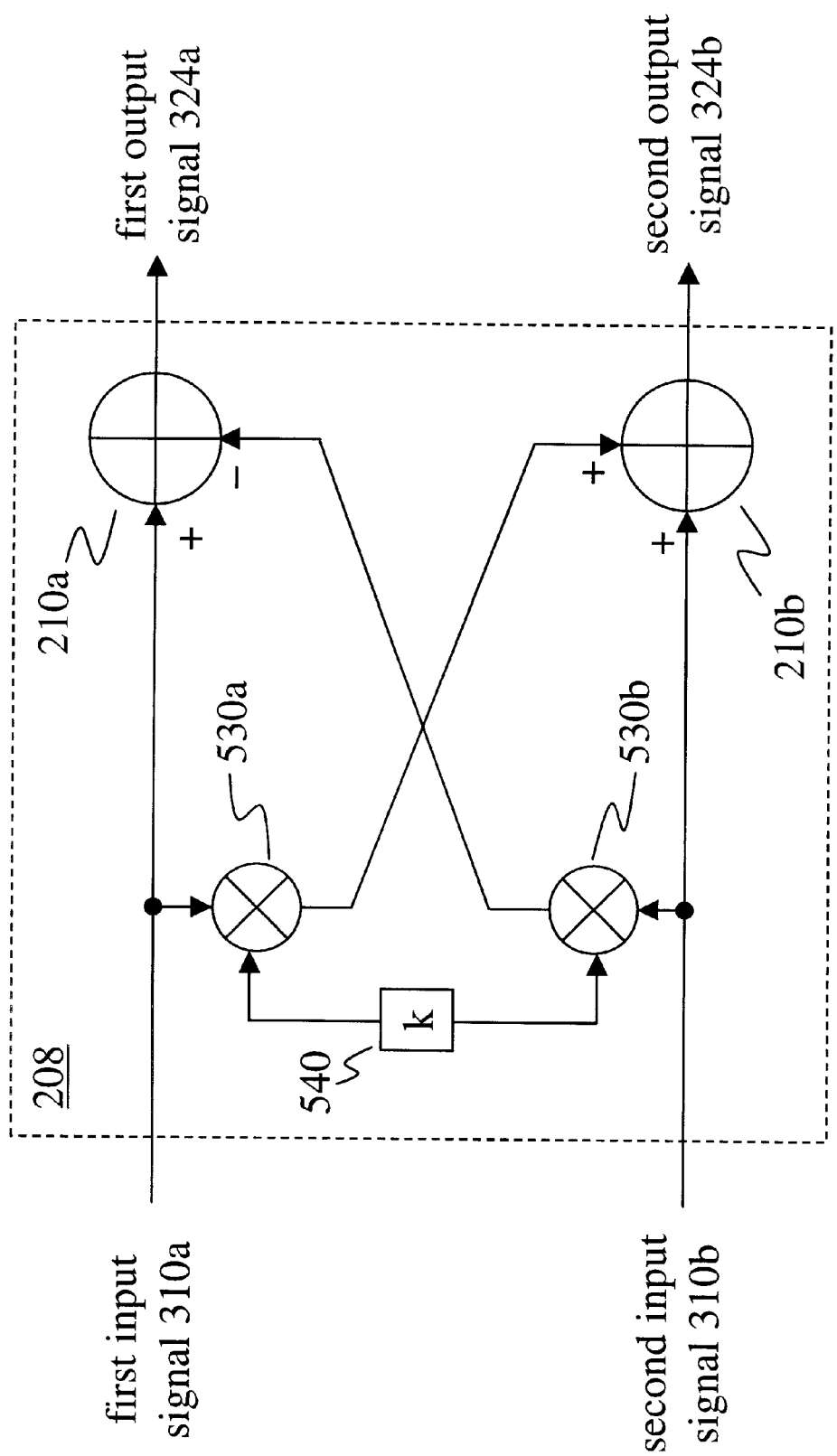
FIG. 17 is a circuit diagram of a phase rotator according to a fourth embodiment of the invention.

A reduction in computational complexity may be obtained by using a phase rotator 208 as shown in FIG. 17 instead. This rotator includes only two multipliers 530a and 530b along with the two adders 210a and 210b and a constant factor k (540). As above, the constant factor may be hard-wired or reprogrammable. The angle of rotation α (in radians) between the complex input signal 310a,b and the complex output signal 324a,b is described by the following expression:

$$\cos\alpha = \frac{1}{\sqrt{1+k^2}},$$

and the ratio between the magnitude of the output vector and the magnitude of the input vector for this rotator is equal to √(1+k²). Many other specific embodiments of and uses for the invention are possible; the examples described herein are provided for explanatory purposes only and do not limit the scope of the invention.

The foregoing description is provided to enable any person skilled in the art to make or use the present invention. Various modifications to these embodiments are possible, and the generic principles presented herein may be applied to other embodiments as well. For example, the invention may be implemented in part or in whole as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a microprocessor or other digital signal processing unit. Additionally, while the modulation applications discussed herein specifically address modulation of a RF carrier, use of the invention is not limited to any particular frequency range, whether for modulation or for other applications. Thus, the present invention is not intended to be limited to the embodiments shown above but rather is to be accorded the widest scope consistent with the principles and novel features disclosed in any fashion herein.

We claim:

1. A baseband modulator including a phase rotator for compensating for a rotation of an input complex signal to avoid spectral degradation thereof and saturation of one or more digital-to-analog converters (DAC)s in the modulator complex signal path, the phase rotator comprising:
   circuitry for receiving the input complex signal; and
   circuitry for rotating the input complex signal to generate a rotated complex signal to be received by the one or more DACs.

2. The baseband modulator of claim 1, wherein the circuitry for rotating the input complex signal includes:
   a first adder responsive to a first and second components of the input complex signal to generate a first component of the rotated complex signal representative of a a difference of the first and second components of the input complex signal; and
   a second adder responsive to the first and second components of the input complex signal to generate a second component of the rotated complex signal representative of a sum of the first and second components of the input complex signal, a phase angle of the input complex signal being different than a phase angle of the rotated complex signal.

3. The baseband modulator of claim 2, wherein the phase angle of the rotated complex signal is closer to π/4 radians than the phase angle of he input complex signal.

4. The baseband modulator of claim 1, wherein the first and second components of each of the input complex signal and the rotated signal are corresponding real and imaginary components, respectively.

5. The baseband modulator of claim 1, wherein the input complex signal is characterized by an in-phase component and a quadrature component.

6. The baseband modulator of claim 1, wherein the input complex signal is based at least in part on a product of a complex data signal and a complex spreading signal of predetermined period.

7. The baseband modulator of claim 1, wherein at least one among the complex data signal and the complex spreading signal represents at least a polar nonreturn-to-zero symbol stream.

8. The baseband modulator of claim 1, wherein a phase angle of the rotated complex signal is closer to π/4 radians than a phase angle of the input complex signal.

9. A method for compensating for a rotation of an input complex signal to avoid spectral degradation thereof and saturation of one or more digital-to-analog converters (DACs) in a modulator complex signal path, the method comprising;
   receiving the input complex signal; and
   rotating the input complex signal to generate a rotated complex signal to be received by the one or more DACS.

10. The method of claim 9, wherein the rotating the input complex signal includes
    generating, responsive to a first and second components of the input complex signal, a first component of the rotated complex signal representative of a difference of the first and second components of the input complex signal; and
    generating, responsive to the first and second components of the input complex signal, a second component of the rotated complex signal representative of a sum of the first and second components of the input complex signal a phase angle of the input complex signal being different than a phase angle of the rotated complex signal.

11. The method of claim 10, wherein the phase angle of the rotated complex signal is closer to π/4 radians than the phase angle of the input complex signal.

12. The method of claim 9, wherein the first and second components of each of the input complex signal and the rotated signal are corresponding real and imaginary components, respectively.

13. The method of claim 9, wherein the input complex signal is characterized by an in-phase component and a quadrature component.

14. The method of claim 9, wherein the input complex signal is based at least in part on a product of a complex data signal and a complex spreading signal of predetermined period.

15. The method of claim 14, wherein at least one among the complex data signal and the complex spreading signal represents at least a polar nonreturn-to-zero symbol stream.

16. The method of claim 9, wherein a phase angle of the rotated complex signal is closer to π/4 radians than a phase angle of the input complex signal.

17. A wireless communication device including a phase rotator for compensating for a rotation of an input complex sign to avoid spectral degradation hereof and saturation of one or more digital-to-analog converters (DAC)s in the modulator complex signal path, the phase rotator comprising:
    circuitry for receiving the input complex signal; and
    circuitry for rotating the input complex signal to generate a rotated complex signal to be received by the one or more DACs.

18. The device of claim 17, wherein the circuitry for rotating the input complex signal includes:
a first adder responsive to a first and second components of the input complex signal to generate a first component of the rotated complex signal representative of a difference of the first and second components of the input complex signal; and
a second adder responsive to the first and second components of the input complex signal to generate a second component of the rotated complex signal representative of a sum of the first and second components of the it complex signal, a phase angle of the input complex signal being different than a phase angle of the rotated complex signal.

19. The device of claim 18, wherein the phase angle of the rotated complex signal is closer to $\pi/4$ radians than the phase angle of the input complex signal.

20. The device of claim 17, wherein the first and second components of each of the input complex signal and the rotated signal are corresponding real and imaginary components, respectively.

21. The device of claim 17, wherein the input complex signal is characterized by an in-phase component and a quadrature component.

22. The device of claim 17, wherein the input complex signal is based at least in part on a product of a complex data signal and a complex spreading signal of predetermined period.

23. The baseband modulator of claim 22, wherein at least one among the complex data signal and the complex spreading signal represents at least a polar nonreturn-to-zero symbol stream.

24. The baseband modulator of claim 17, wherein a phase angle of the rotated complex signal is closer to $\pi/4$ radians than a phase angle of the input complex signal.

25. A data processor readable medium including instructions for compensating for a rotation of an input complex signal to avoid spectral degradation thereof and saturation of one or more digital-to-analog converters (DACS) in a modulator complex signal path, the instructions comprising:

receiving the input complex signal; and
rotating the input complex signal to generate a rotated complex signal to be received by the one or more DACs.

26. The medium of claim 25, wherein the rotating the input complex signal includes:
generating, responsive to a first and second components of the input complex signal, a first component of the rotated complex signal representative of a difference of the first and second components of the input complex signal; and
generating, responsive to the first and second components of the input complex signal, a second component of the rotated complex signal representative of a sum of the first and second components of the input complex signal, a phase angle of the input complex signal being different than a phase angle of the rotated complex signal.

27. The medium of claim 26, wherein the phase angle of the rotated complex signal is closer to $\pi/4$ radians than the phase angle of the input complex signal.

28. The medium of claim 25, wherein the first and second components of each of the input complex signal and the rotated signal are corresponding real and imaginary components, respectively.

29. The medium of claim 25, wherein the input complex signal is characterized by an in-phase component and a quadrature component.

30. The medium of claim 25, wherein the input complex signal is based at least in part on a product of a complex data signal and a complex spreading signal of predetermined period.

31. The medium of claim 30, wherein at least one among the complex data signal and the complex spreading signal represents at least a polar nonreturn-to-zero symbol stream.

32. The medium of claim 25, wherein a phase angle of the rotated complex signal is closer to $\pi/4$ radians than a phase angle of the input complex signal.

\* \* \* \* \*